(12) United States Patent
 Tanaka

(10) Patent No.: US 12,554,009 B2
(45) Date of Patent: Feb. 17, 2026

(54) IMAGE ANALYSIS DEVICE AND IMAGE ANALYSIS METHOD

(71) Applicant: NEC Corporation, Tokyo (JP)

(72) Inventor: Taichi Tanaka, Tokyo (JP)

(73) Assignee: NEC CORPORATION, Tokyo (JP)

(*) Notice: Subject to any disclaimer, the term of this patent is extended or adjusted under 35 U.S.C. 154(b) by 391 days.

(21) Appl. No.: 18/026,693

(22) PCT Filed: Sep. 29, 2020

(86) PCT No.: PCT/JP2020/036844
§ 371 (c)(1),
(2) Date: Mar. 16, 2023

(87) PCT Pub. No.: WO2022/070243
PCT Pub. Date: Apr. 7, 2022

(65) Prior Publication Data
US 2023/0341544 A1    Oct. 26, 2023

(51) Int. Cl.
*G01S 13/90*    (2006.01)
*G06T 7/00*    (2017.01)

(52) U.S. Cl.
CPC .......... *G01S 13/9021* (2019.05); *G06T 7/97* (2017.01); *G06T 2207/10028* (2013.01)

(58) Field of Classification Search
CPC ... G01S 13/9021; G01S 13/9023; G06T 7/97; G06T 2207/10028; G06T 7/20
See application file for complete search history.

(56) References Cited

U.S. PATENT DOCUMENTS

| | | | | |
|---|---|---|---|---|
| 7,042,386 B2* | 5/2006 | Woodford | ............. | G01S 13/904 |
| | | | | 342/25 R |
| 7,167,126 B2* | 1/2007 | Wittenberg | ............. | G01S 13/46 |
| | | | | 342/194 |
| 10,832,424 B2* | 11/2020 | Fletcher | .................... | G06T 7/35 |
| 2016/0211906 A1* | 7/2016 | Woodsum | ................ | H04B 1/16 |

FOREIGN PATENT DOCUMENTS

| | | |
|---|---|---|
| CN | 105717480 A | 6/2016 |
| JP | 2012-533051 A | 12/2012 |
| JP | 2017-072473 A | 4/2017 |
| WO | 2011/003836 A1 | 1/2011 |
| WO | 2019/215819 A1 | 11/2019 |

OTHER PUBLICATIONS

International Search Report for PCT Application No. PCT/JP2020/036844, mailed on Dec. 8, 2020.

* cited by examiner

*Primary Examiner* — Illiam Kelleher
*Assistant Examiner* — Kenneth W Good
(74) *Attorney, Agent, or Firm* — Sughrue Mion, PLLC

(57) ABSTRACT

The image analysis device 100 includes a complex matrix calculation unit 11 which calculates a complex matrix that reflects a phase difference in all pairs of images in multiple images in which a same region is recorded, a parameter candidate selection unit 12 which selects multiple candidates of parameter which explains a phase shift, a candidate evaluation unit 13 which evaluates likelihood of the multiple candidates using the complex matrix and a predetermined weight matrix, and a statistics calculation unit 14 which weights the candidates of parameter by the likelihood and calculates statistics of the candidates of parameter.

12 Claims, 10 Drawing Sheets

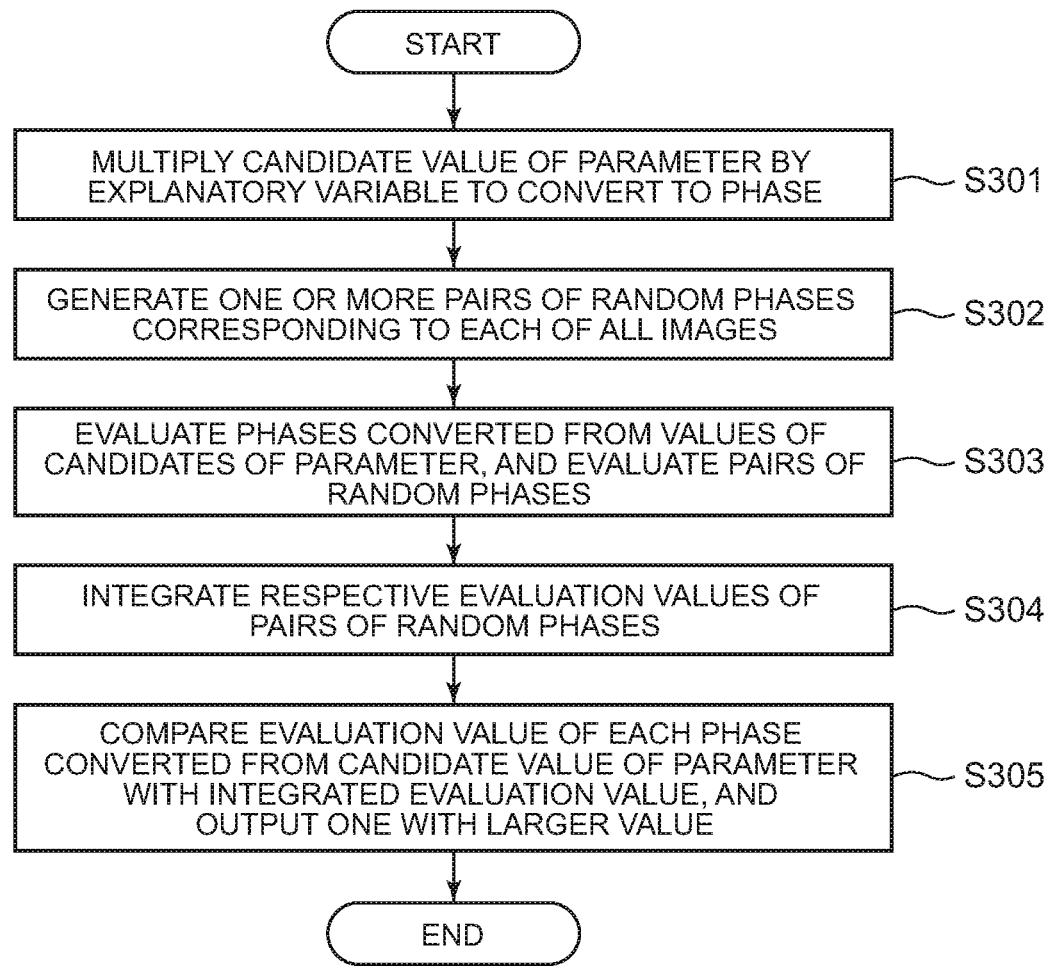
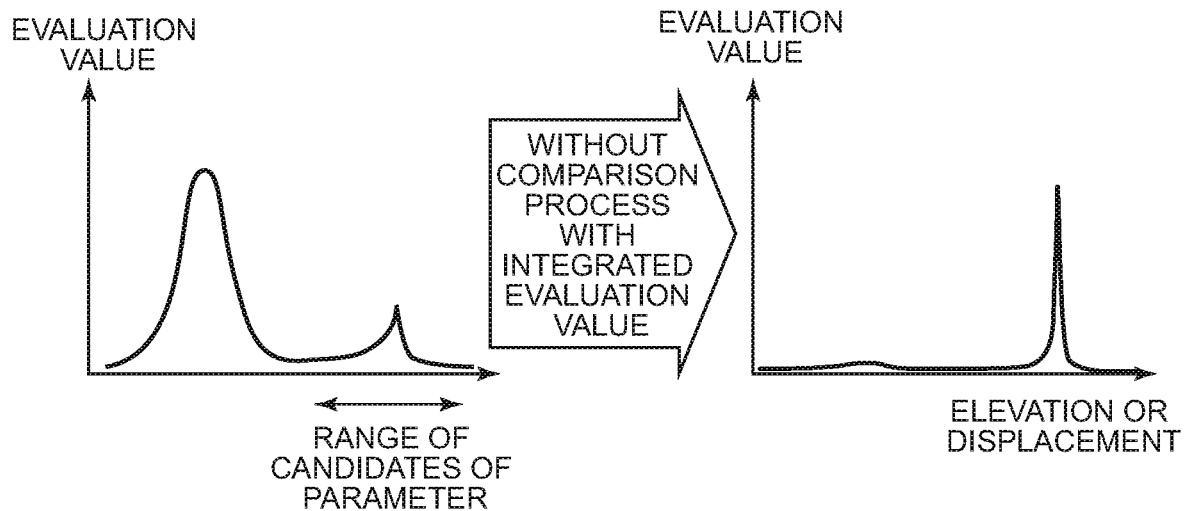

IMAGE ANALYSIS DEVICE AND IMAGE ANALYSIS METHOD

This application is a National Stage Entry of PCT/JP2020/036844 filed on Sep. 29, 2020, the contents of all of which are incorporated herein by reference, in their entirety.

TECHNICAL FIELD

This invention relates to an image analysis device and an image analysis method for analyzing an elevation or a deformation based on an interferogram generated from received electromagnetic waves from a synthetic aperture radar.

BACKGROUND ART

Synthetic aperture radar (SAR) technology is a technology for obtaining an image equivalent to the image by an antenna having a large aperture, when a flying object such as artificial satellite, aircraft, or the like transmits and receives a radio wave while the flying object moves. The synthetic aperture radar is utilized, for example, for analyzing an elevation or a ground surface deformation by signal-processing reflected waves from the ground surface, etc. When SAR technology is used, the analyzer takes time-series SAR images (SAR data) obtained by a synthetic aperture radar as input, and performs time-series analysis of the input SAR images.

Interferometric SAR analysis is an effective method for analyzing an elevation or a ground surface deformation. In the interferometric SAR analysis, the phase difference between radio signals of plural (for example, two) SAR images taken at different times is calculated. A change in distance between the flying object and the ground that occurred during the shooting time period is detected.

Patent literature 1 describes an analysis method that uses a coherence matrix. A coherence is calculated by complex correlation of pixels at the same position in plural SAR images among N (N≥2) SAR images. Suppose that (m, n) is a pair of SAR images and $c_{m,n}$ are components of the coherence matrix. Respective m and n are less than or equal to N and indicate one of the N SAR images. The phase $\theta_{m,n}$ (specifically, the phase difference) is calculated for each pair of SAR images. Then, an absolute value of the value obtained by averaging $\exp(-j\theta_{m,n})$ for a plurality of pixels in a predetermined area including pixels to be calculated as coherence is the component $c_{m,n}$ of the coherence matrix.

The argument $\angle c_{m,n}$ of $c_{m,n}$ corresponds to the average phase (specifically, the phase difference). The magnitude of the variance of the phase $\theta_{m,n}$ can be grasped from the absolute value of c, i.e., $|c_{m,n}|$.

The coherence matrix includes information that can be used to estimate the phase when the noise is removed. The coherence matrix also includes information that allows the degree of phase noise (i.e., variance) to be estimated.

The fact that phase $\theta_{m,n}$ correlates with a displacement velocity and a shooting time difference is used for displacement analysis of the ground surface and other objects. For example, the displacement is estimated based on the average value of the phase difference. It is possible to verify the accuracy of the displacement analysis using the amount of phase noise. Thus, the coherence matrix can be used for the displacement analysis.

For elevation analysis, the fact that the phase $\theta_{m,n}$ correlates with an elevation of the object being analyzed and a distance between the flying objects (for example, the distance between two shooting positions of the flying objects) is used. For example, the elevation is estimated based on the average value of the phase difference. It is possible to verify the accuracy of the elevation analysis using the amount of phase noise. Thus, the coherence matrix can be used for the elevation analysis.

CITATION LIST

Patent Literature

PTL 1: International Publication No. 2011/003836

SUMMARY OF INVENTION

Technical Problem

According to the method described in patent literature 1, noise included in the phase difference can be reduced. The method described in patent literature 1 can also be used to estimate a displacement (amount of displacement) and an elevation of a ground surface and an object. For example, a value h related to elevation and a value v related to displacement velocity that maximize the evaluation equation expressed in equation (1) below are calculated. Hereinafter, h is referred to as the elevation and v as the displacement velocity.

[Math. 1]

$$\exp(s^H(\Sigma \circ W)s) \tag{1}$$

In equation (1), W denotes a weight matrix. As W, a power of the absolute value of the coherence matrix is used, for example. "H" denotes an adjoint matrix. s in equation (1) is expressed as in equation (2), for example. $\lambda$ denotes a wavelength of used electromagnetic wave. $B_{perp}$ denotes a transposed vector of row vectors whose elements are baseline distances at the time each of the N images was acquired. $B_{temp}$ denotes a transposed vector of row vectors whose elements are shooting time each of the N images was acquired. $B_{perp}$ and $B_{temp}$ are expressed as follows.

[Math. 2]

$$s = \exp\left(\frac{4\pi j}{\lambda}(B_{perp}h + B_{temp}v)\right) \tag{2}$$

$$B_{perp} = (b_1\ b_2 \ldots b_N)^T$$

$$B_{temp} = (t_1\ t_2 \ldots t_N)^T$$

With respect to $\Sigma$, for example, an average of $\exp(-j\theta_{m,n})$ or $A_m \cdot A_n \cdot \exp(-j\theta_{m,n})$ as a coherence matrix. $A_m$ and $A_n$ are mentioned later.

FIG. 14 is an explanatory diagram showing an example of the elevation and displacement estimation results (analysis results). The displacement is (displacement velocity×time). In FIG. 14, the vertical axis indicates the evaluation value. Since the optimal value (optimal elevation and displacement) are estimated by maximizing an evaluation equation, the optimal value is a value that maximizes the evaluation equation, i.e., the value with the largest evaluation value, where the effect of noise is reduced.

However, due to the environment regarding reflection of electromagnetic waves at the time of observation, the generation status of noise varies in various ways. As a result, for example, the second peak with the second highest evaluated value may occur as illustrated in FIG. 14. In fact, it is possible that the elevation and displacement corresponding to the second peak are the true optimum values or that the true optimum values are not obtained.

It is an object of the present invention to provide an image analysis device and an image analysis method that make it possible to present a reliability of an analysis result.

Solution to Problem

An image analysis device according to the present invention includes complex matrix calculation means for calculating a complex matrix that reflects a phase difference in all pairs of images in multiple images in which a same region is recorded, parameter candidate selection means for selecting multiple candidates of parameter which explains a phase shift, candidate evaluation means for evaluating likelihood of the multiple candidates using the complex matrix and a predetermined weight matrix, and statistics calculation means for weighting the candidates of parameter by the likelihood and calculating statistics of the candidates of parameter.

An image analysis method according to the present invention includes calculating a complex matrix that reflects a phase difference in all pairs of images in multiple images in which a same region is recorded, selecting multiple candidates of parameter which explains a phase shift, evaluating likelihood of the multiple candidates using the complex matrix and a predetermined weight matrix, and weighting the candidates of parameter by the likelihood and calculating statistics of the candidates of parameter.

An image analysis program according to the present invention causes a computer to execute a process of calculating a complex matrix that reflects a phase difference in all pairs of images in multiple images in which a same region is recorded, a process of selecting multiple candidates of parameter which explains a phase shift, a process of evaluating likelihood of the multiple candidates using the complex matrix and a predetermined weight matrix, and a process of weighting the candidates of parameter by the likelihood and calculating statistics of the candidates of parameter.

Advantageous Effects of Invention

According to the present invention, it becomes to be possible to present a reliability of an analysis result.

BRIEF DESCRIPTION OF DRAWINGS

FIG. 7 It depicts a flowchart showing an operation of the candidate evaluation unit in the image analysis device of the third example embodiment.

FIG. 8A It depicts an explanatory diagram for explaining the effect of the third example embodiment.

DESCRIPTION OF EMBODIMENTS

Hereinafter, example embodiments of the present invention will be explained with reference to the drawings.

Example Embodiment 1

Figure 1:
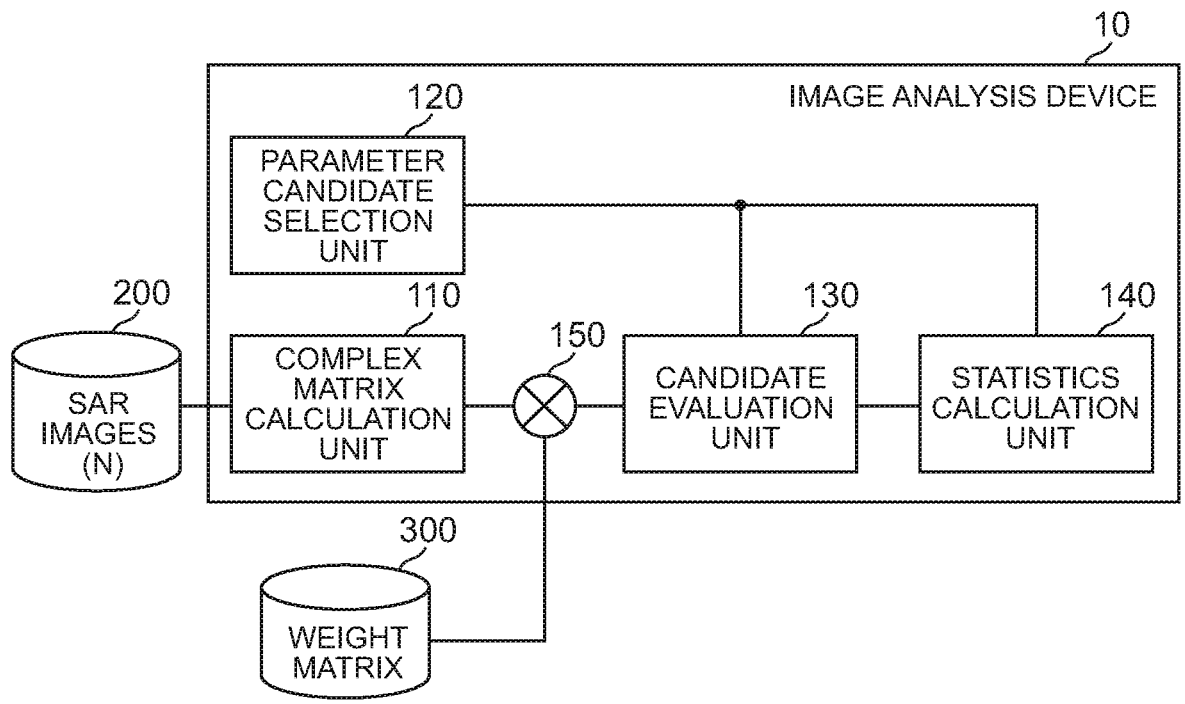
FIG. 1 It depicts a block diagram showing the image analysis device of the first example embodiment.

FIG. 1 is a block diagram showing a configuration example of the image analysis device of the first example embodiment. The image analysis device 10 shown in FIG. 1 includes a complex matrix calculation unit 110, a parameter candidate selection unit 120, a candidate evaluation unit 130, a statistics calculation unit 140, and a multiplication unit 150.

A SAR image storage 200 stores N SAR images in advance. The weights are stored in advance in a weight matrix storage 300. In this example embodiment, the weight matrix storage 300 stores a weight matrix for determining which image pair is focused to fit for phase. The SAR image storage 200 and the weight matrix storage 300 may be external to or included in the image analysis device 10.

The weight matrix is calculated by a weight matrix calculation unit (not shown in FIG. 1), for example. The weight matrix calculation unit calculates, as elements of an m-by-n weight matrix, values that are small between noisy image (SAR image) pairs m, n (m, n: 1 to N) and large between image pairs m, n with less noise. As such a weight matrix, the inverse matrix with a negative sign of the absolute value of the coherence matrix can be used. As an example, the weight matrix calculation unit can use a value obtained by dividing the output of the complex matrix calculation unit 110 by the number of added pixels as an estimate of the coherence matrix. The weight matrix calculation unit may also use a power of the absolute value of the coherence matrix itself as the weight matrix. The weight matrix calculation unit may be included in the image analysis device 10.

The complex matrix calculation unit 110 calculates a complex conjugate of the value of the pixel of image number n for images of image number m and image number n. Thus, the complex matrix calculation unit 110 calculates a complex matrix that reflects the phase difference in all pairs of images in the multiple images in which the same region is recorded. The complex matrix calculation unit 110 multiplies the value of each of the pixels in the image of image number m by the conjugate complex of the value of each of the pixels of image number n. Furthermore, the complex matrix calculation unit 110 generates a complex matrix whose element of n-th row and m-th column is obtained by adding the results of the above multiplication of the pixels within a predetermined range from a pixel of interest. The complex matrix calculation unit 110 performs the process of generating the matrix for each of all pixels, i.e., each of all pixels is a pixel of interest. When the complex matrix calculation unit 110 adds the results of multiplication for pixels within a predetermined range from a pixel of interest, the complex matrix calculation unit 110 may use the value of the pixel of interest as the result of multiplication. In that case, the complex matrix calculation unit 110 does not perform an addition process in effect. In other words, the complex matrix calculation unit 110 does not perform an averaging process using pixels in the predetermined range.

The parameter candidate selection unit 120 selects of the values of candidates of parameter related to the phase shift, i.e., the values of candidates of parameter that explains a phase difference. The parameter that explains a phase difference is a displacement velocity or an elevation, for example. However, they are examples, and other types of parameters may be used, or other types of parameters may be used together with a displacement velocity or an elevation. Values of candidates of parameter are selected values (for example, 3 m, 4 m, 5 m, etc. for elevation) for one type of parameter (for example, displacement velocity or elevation).

Taking the displacement velocity as an example, (shooting time difference×displacement velocity) corresponds to the phase difference. Taking the elevation as an example, (baseline distance×elevation) corresponds to the phase difference.

The candidate evaluation unit 130 evaluates likelihood of values of all candidates of parameter selected by the parameter candidate selection unit 120.

The statistics calculation unit 140 calculates an average value and a variance of the parameter candidates, weighted by likelihood.

The multiplication unit 150 multiplies the complex matrix which is the output of the complex matrix calculation unit 110, with the weight matrix stored in the weight matrix storage 300, and outputs the multiplication result to the candidate evaluation unit 130.

Figure 2:
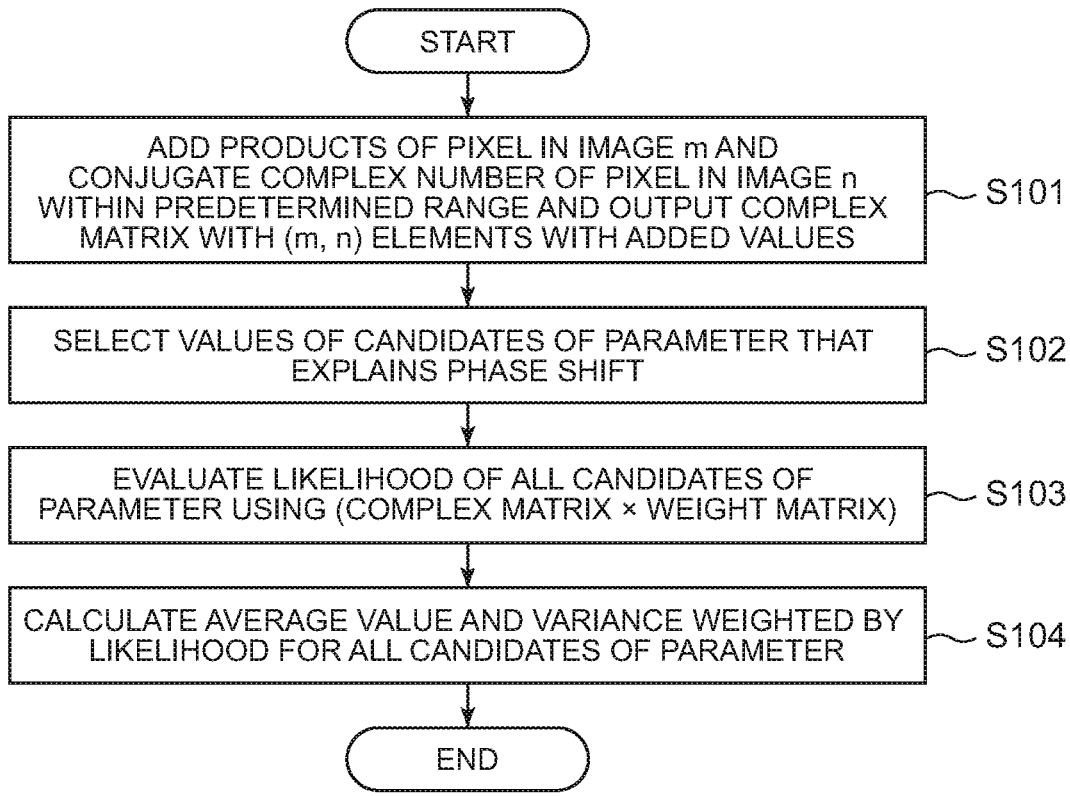
FIG. 2 It depicts a flowchart showing an operation of the image analysis device of the first example embodiment.

Next, the operation of image analysis device 10 of this example embodiment is explained with reference to the flowchart of FIG. 2.

The complex matrix calculation unit 110 performs a process of generating a complex matrix (step S101). That is, for the image of image number m and the image of image number n, the complex matrix calculation unit 110 adds products of a pixel in image m and a conjugate complex number of image n within a predetermined range as an object each of the pixels (as the pixel of interest). The predetermined range is, for example, one or more pixels in the neighborhood of the pixel of interest. In such a case, the complex matrix calculation unit 110 adds products for one or more pixels in the neighborhood of the pixel of interest. The predefined range may be a range according to predefined criteria. In such a case, the complex matrix calculation unit 110 adds products with respect to one or more pixels that satisfy the criteria for the interest pixel. Furthermore, the complex matrix calculation unit 110 generates a complex matrix whose element of n-th row and m-th column is obtained by adding the above multiplication in the predefined range. The complex matrix calculation unit 110 then outputs the generated complex matrix.

By executing the process of step S101, the complex matrix calculation unit 110 calculates a matrix that includes an estimate of the averaged phase, i.e., a phase in which the effect of noise is reduced, and that allows to determine the characteristics of noise. The complex matrix calculation unit 110 may also calculate a coherence matrix in the process of step S101.

When calculating a coherence matrix, the complex matrix calculation unit 110 calculates a coherence matrix C for the N SAR images (complex images: including amplitude and phase information) stored in the SAR image storage 200, for example. For example, suppose that (m, n) is a pair of SAR images and $c_{m,n}$ are components of the coherence matrix. Respective m and n are less than or equal to N and indicate one of the N SAR images. The complex matrix calculation unit 110 calculates the phase $\theta_{m,n}$ (specifically, the phase difference). Then, the complex matrix calculation unit 110 sets an absolute value of the value obtained by averaging $\exp(-j\theta_{m,n})$ for a plurality of pixels in a predetermined area including pixels to be calculated as the component $c_{m,n}$ of the coherence matrix C.

The complex matrix calculation unit 110 may also average $A_m \cdot A_n \cdot \exp(-j\theta_{m,n})$ with $A_m$ as intensity in SAR image m and $A_n$ as intensity in SAR image n. The complex matrix calculation unit 110 may divide each element of the matrix obtained as the average of $A_m \cdot A_n \cdot \exp(-j\theta_{m,n})$ by a value which is obtained by dividing a sum of diagonal components of the matrix by N. The complex matrix calculation unit 110 may multiply a diagonal matrix from left to right, wherein the diagonal matrix is a matrix having diagonal components which are the $-\frac{1}{2}$ power of diagonal components of the matrix obtained as the average of $A_m \cdot A_n \cdot \exp(-j\theta_{m,n})$.

This method of calculating the coherence matrix is just one example, and the coherence matrix calculation unit can calculate the coherence matrix using various methods.

The parameter candidate selection unit 120 selects values of candidates of parameter that explains the phase difference (step S102). As mentioned above, the parameter is a displacement velocity or an elevation. For example, when the parameter is a displacement velocity, the parameter candidate selection unit 120 selects multiple values of displacement velocity as candidate values. When the parameter is an elevation, the parameter candidate selection unit 120 selects multiple values of elevation as candidate values. The parameter candidate selection unit 120 selects, as candidate values, values that can be assumed according to the usage of the image analysis device 10 at a certain interval from a predetermined range. The parameter candidate selection unit 120 may also randomly select candidate values from within a predetermined range.

The candidate evaluation unit 130 evaluates the values of all the candidates selected by the parameter candidate selection unit 120 using the complex matrix generated by the complex matrix calculation unit 110 (step S103). The candidate evaluation unit 130 evaluates the values of all the candidates of parameter using the formula including (complex matrix×weight matrix) as the evaluation formula in step S103. In other words, the candidate evaluation unit 130 evaluates likelihood of values of all candidate. (complex matrix×weight matrix) is calculated by the multiplication unit 150.

The fact that the candidate evaluation unit 130 evaluates likelihood means to determine matching degree between the value of the candidate and the values of the evaluation formula including (complex matrix×weight matrix). The fact that the candidate evaluation unit 130 uses the formula including (complex matrix×weight matrix) as the evaluation formula corresponds, for example, to using the above equation (1). When using equation (1), the candidate evaluation unit 130 uses the complex matrix generated by the complex matrix calculation unit 110 as Σ in equation (1).

The statistics calculation unit 140 calculates statistics of the candidate values (step S104). In step S104, the statistics calculation unit 140 calculates an average value (weighted average value) of the values of the candidates of parameter weighted by the matching degree (likelihood) and a variance (weighted variance) of the values of the candidates of parameter weighted by the matching degree (likelihood).

Figure 3:
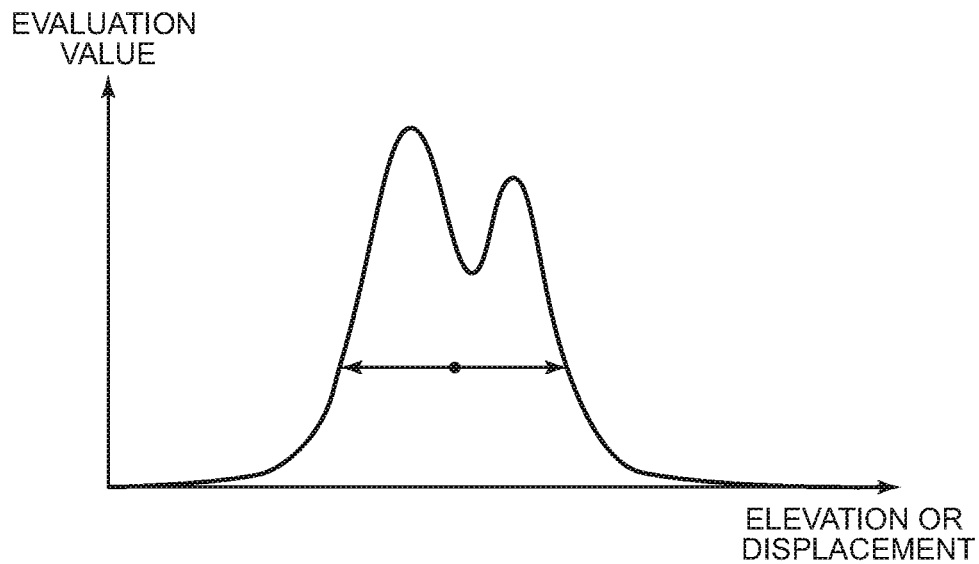
FIG. 3 It depicts an explanatory diagram showing an operation of the image analysis device of the first example embodiment.

FIG. 3 is an explanatory diagram showing an operation of the image analysis device. In FIG. 3, statistics (variance and average value) are described for an example of an elevation or displacement analysis result. In FIG. 3, the variance (specifically, the square root of the variance) corresponds to the arrow, and the average value corresponds to the black circle in the center.

In this example embodiment, in the image analysis device 10, since the statistical value calculation unit 140 calculates statistics using the matching degree calculated by the candidate evaluation unit 130, the statistics allows to determine how reliable the estimated values of parameters (for example, elevation and displacement) are.

In this example embodiment, evaluation on one type of parameter can be performed, but evaluation on two types of parameters can also be performed at once.

Example Embodiment 2

Figure 4:
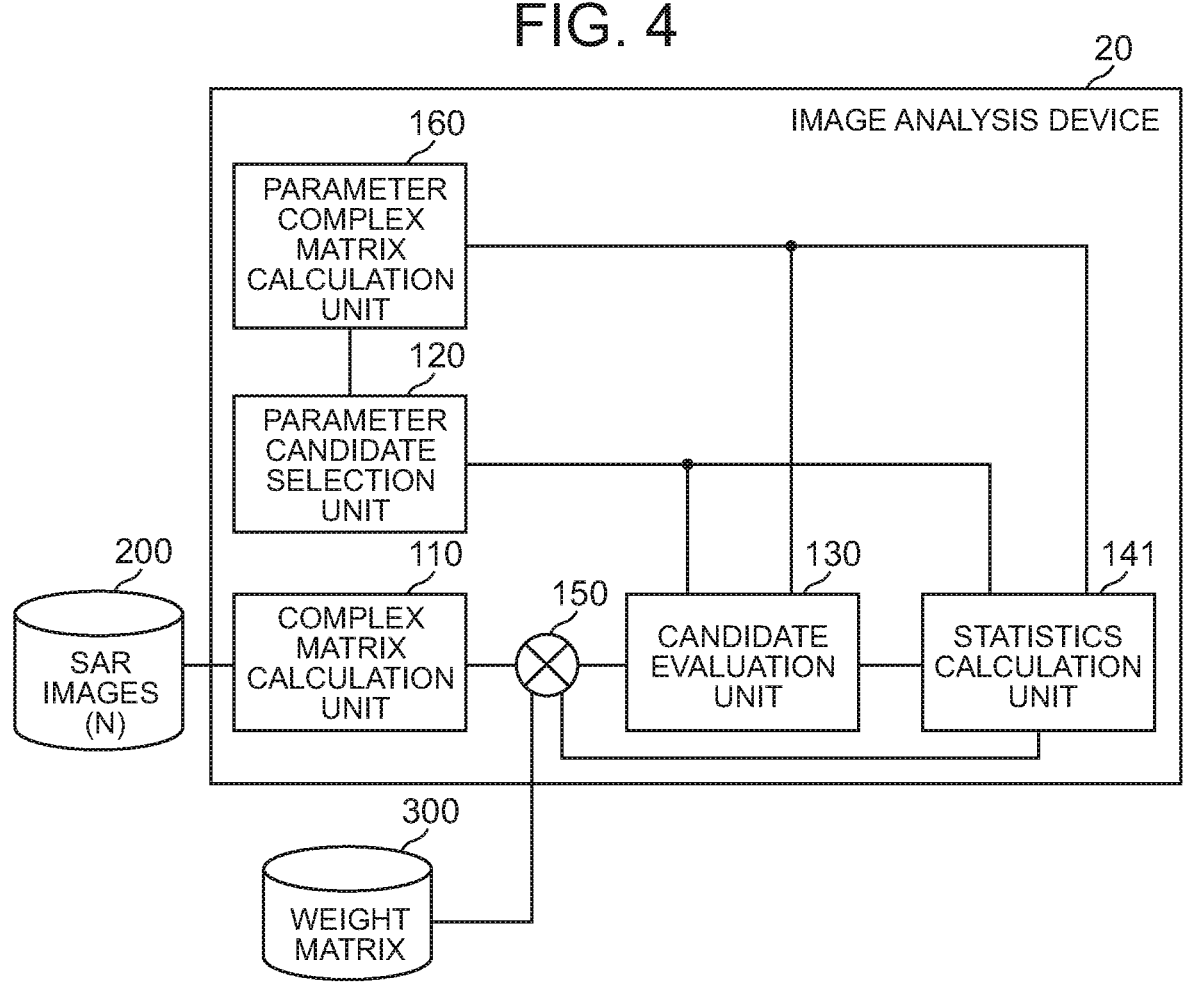
FIG. 4 It depicts a block diagram showing a configuration example of the image analysis device of the second example embodiment.

FIG. 4 is a block diagram showing a configuration example of the image analysis device of the second example embodiment. The image analysis device 20 shown in FIG. 4 includes a parameter complex matrix calculation unit 160 in addition to the components of the image analysis device 10 in the first example embodiment. The statistical value calculation unit 141 in this example embodiment has a function described below in addition to the function of the statistical value calculation unit 140 in the first example embodiment.

When there are two or more parameters that explain a phase difference, the number of candidates of parameter selected by the parameter candidate selection unit 120 may become enormous. In such a case, the amount of computation in the complex matrix calculation unit 110 and the candidate evaluation unit 130 becomes significant. For example, when the number of candidates of displacement velocity is 1000 and the number of candidates of elevation is 1000, operations for 1000×1000 are required. In this example embodiment, the image analysis device 20 reduces the amount of operations by using an estimation result for one type of parameter in the evaluation process for another type of parameter.

The parameter complex matrix calculation unit 160 calculates a complex matrix $L_{k,m,n}$ using the following equation (3), for example. The complex matrix calculated by the parameter complex matrix calculation unit 160 is hereinafter referred to as a parameter complex matrix. The parameter complex matrix is a complex matrix such that it has a phase value in each image for each of the candidates of parameter.

$$L_{k,m,n} = \exp(-jp_k(B_m - B_n)) \quad (3)$$

In equation (3), m and n denote image numbers. k denotes the number of a candidate of parameter. Accordingly, "k,m,n" is an index of the candidate of parameter between the SAR image with image number m and the SAR image with image number n. $p_k$ indicates a value of a candidate of parameter. B corresponds to an explanatory variable. When the parameter is a displacement velocity, $B_m$, $B_n$ indicate shooting times. In that case, $P_k$ is a displacement velocity. When the parameter is an elevation, B, $B_{mn}$ indicates a baseline distance, for example. In that case, p is an elevation.

The complex matrix $L_{k,m,n}$ corresponds to a matrix for canceling a phase difference explained by a candidate of parameter that explains the phase difference.

In this example embodiment, when the likelihood (matching degree) of the parameter candidate $p_k$ calculated by the candidate evaluation unit 130 is $s_k$, the statistics calculation unit 141 also calculates an average value A of the parameter complex matrix expressed, for example, by equation (4), in addition to an average value (specifically, weighted average value) of $s_k$. In equation (4), $\Sigma_k$ is an operator that calculates the sum over k.

$$A = (\Sigma_k L_{k,m,n} s_k)/(\Sigma_k s_k) \quad (4)$$

In this example embodiment, the multiplication unit 150 multiplies the complex matrix that is an output of the complex matrix calculation unit 110, the weight matrix stored in the weight matrix storage 300, and the average value A of the parameter complex matrix that is an output of the statistics calculation unit 141, and outputs the multiplication result to the candidate evaluation unit 130. When the statistics calculation unit 141 is performing evaluation on one type of parameter, the multiplication unit 150 multiplies the parameter complex matrix of other types of parameters. Therefore, phase differences related to other types of parameters are excluded in an output of the multiplication unit 150.

Next, the operation of the image analysis device 20 in this example embodiment is explained with reference to the flowchart of FIG. 5. The operations of the complex matrix calculation unit 110 and the candidate evaluation unit 130 are the same as those in the first example embodiment.

Figure 5:
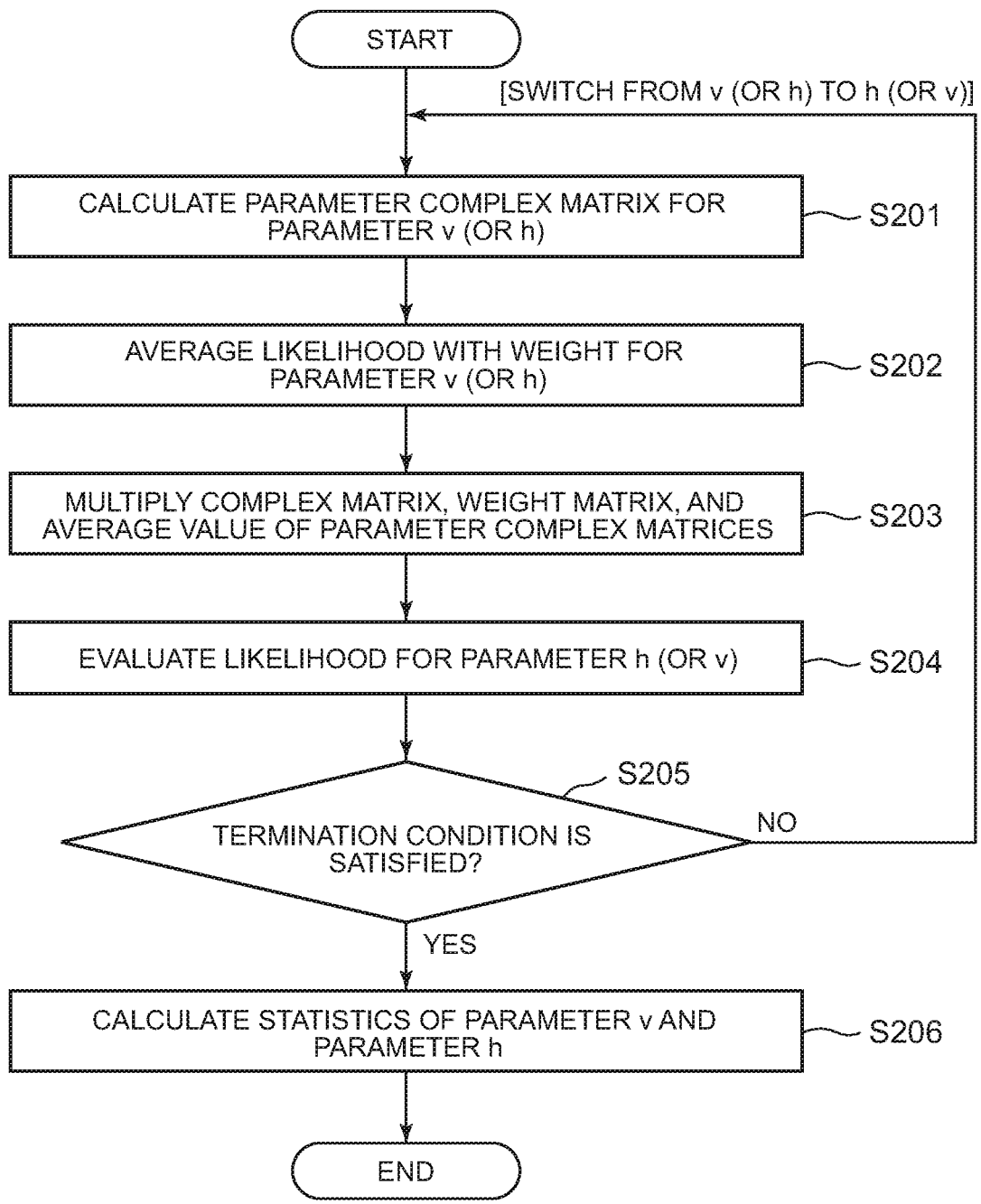
FIG. 5 It depicts a flowchart showing an operation of the image analysis device of the second example embodiment.

In the process illustrated in FIG. 5, processing for one type of parameter alternates with processing for another type of parameter. Hereinafter, suppose that the parameter of one type is a displacement velocity v, and the parameter of another type is an elevation h. First, the case where processing related to the elevation h is performed is taken as an example.

When the process regarding the elevation h is executed, the parameter complex matrix calculation unit 160 calculates a parameter complex matrix of the displacement velocity v (step S201). The statistics calculation unit 141 calculates a weighted average of the likelihood $s_k$ with respect to the displacement velocity v (step S202). The weighted average value corresponds to a parameter complex matrix reflecting the phase when the displacement velocity v is plausible. The statistic calculator 141 also calculates an average value A of the parameter complex matrix with respect to the displacement velocity v.

The multiplication unit 150 multiplies the complex matrix that is an output of the complex matrix calculation unit 110, the weight matrix stored in the weight matrix storage 300, and the average value A of the parameter complex matrices that is an output of the statistics calculation unit 141 (step S203).

The candidate evaluation unit 130 evaluates the likelihood of the values of all candidates of elevation h in the same way as in the first example embodiment (step S204). As mentioned above, since the parameter complex matrix corresponds to a matrix for canceling the phase difference explained by the candidates of parameter that explains the phase difference (in this case, candidate of displacement velocity v), the candidate evaluation unit 130 can perform the evaluation for the elevation h, while the influence of the displacement velocity v is eliminated.

When the termination condition is satisfied, the process moves to step S206. When the termination condition is not satisfied, the process returns to step S201. The processing of steps S201 to S204 is considered a loop process. When the next loop process is executed by returning to step S201, the processing object is switched. In this example, the processing object is switched from the elevation h to the displacement velocity v.

When the process with respect to the displacement velocity v is executed, the parameter complex matrix calculation unit 160 calculates the parameter complex matrix for the elevation h (step S201). The statistics calculation unit 141 calculates a weighted average of the likelihood $s_k$ with respect to the elevation h (step S202). The weighted average value corresponds to a parameter complex matrix reflecting the phase when the elevation h is plausible. The statistic calculator 141 also calculates an average value A of the parameter complex matrix with respect to elevation h.

The multiplication unit 150 multiplies the complex matrix which is an output of the complex matrix calculation unit 110, the weight matrix stored in the weight matrix storage 300, and the average value A of the parameter complex matrix which is an output of the statistics calculation unit 141 (step S203).

The candidate evaluation unit 130 evaluates the likelihood of the values of all candidates of displacement velocity v (step S204). As mentioned above, since the parameter complex matrix corresponds to a matrix for canceling the phase difference explained by the candidates of parameter that explains the phase difference (in this case, candidate of elevation h), the candidate evaluation unit 130 can perform the evaluation of the displacement velocity v with the influence of the elevation h eliminated.

When the termination condition is satisfied, the process moves to step S206. When the termination condition is not satisfied, the process returns to step S201.

For example, the termination condition is that the likelihood of all parameters (in this example, displacement velocity v and elevation h) is less than a predetermined value relative to the values obtained in the previous processing in step S204. Thus, the termination condition is that the amount of variation in the likelihood of the parameters has become smaller. In other words, the termination condition is that the likelihood of the parameter is judged to have converged to the optimal value. The condition that the loop process of steps S201 to S204 is executed a predetermined number of times may be used as the termination condition, for example.

In this example embodiment, since the evaluation process for one parameter is executed independently of the evaluation process for other parameters, the process becomes to be more efficient than when the evaluation process for multiple parameters is executed all at once. As a result, the amount of calculations in the image analysis device 20 is reduced.

In addition, when the evaluation process for one parameter is being performed, the parameter complex matrix can be used to cancel phase differences explained by other parameter candidates, so that the evaluation process is not affected by phase differences that depend on other parameters. As a result, the time required for the average value and the variance calculated by the statistics calculation unit 141 to converge to optimal values is reduced.

Although two types of parameters are illustrated in this example embodiment, the image analysis device 20 may perform evaluation processes with respect to three or more types of parameters. The image analysis device 20 may also be configured to perform evaluation processes with respect to multiple types of parameters in parallel and simultaneously.

Example Embodiment 3

Figure 6:
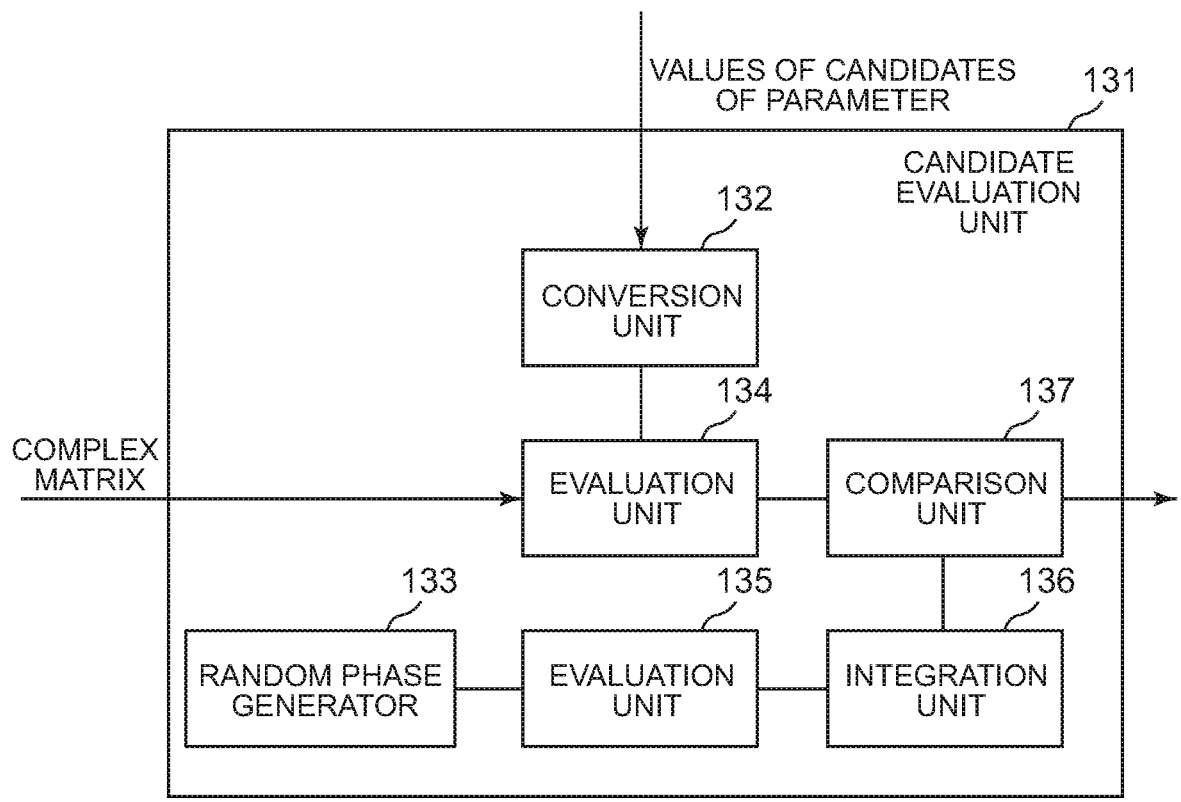
FIG. 6 It depicts a block diagram showing a configuration example of the candidate evaluation unit in the image analysis device of the third example embodiment.

FIG. 6 is a block diagram showing a configuration example of the candidate evaluation unit in the image analysis device of the third example embodiment. In the third example embodiment, a candidate evaluation unit 131 is provided instead of the candidate evaluation unit 130 in the first and second example embodiments.

The candidate evaluation unit 131 shown in FIG. 6 includes a conversion unit 132, a random phase generator 133, an evaluation unit 134, an evaluation unit 135, an integration unit 136, and a comparison unit 137.

The conversion unit 132 multiplies a value of a candidate of parameter (for example, a value of a candidate of the displacement velocity v or a value of a candidate of the elevation h) by an explanatory variable B to convert the candidate value of the parameter to a value (hereinafter, referred to as a phase) corresponding to a phase. The random phase generator 133 generates one or more pairs of random phases for each of all SAR images.

The evaluation unit 134 evaluates the phase output by the conversion unit 132 and outputs an evaluation value (first evaluation value). The evaluation unit 135 evaluates the pair of random phases output by the random phase generator 133 and outputs an evaluation value (second evaluation value). The integration unit 136 integrates the evaluation values of the pairs of random phases into an integrated evaluation value. The comparison unit 137 compares the evaluation values of each phase (each phase corresponding to each candidate of parameter) output by the conversion unit 132 with the integrated evaluation value.

The configuration of the image analysis device other than the candidate evaluation unit 131 is the same as that of the image analysis device 10 of the first example embodiment or the image analysis device 20 of the second example embodiment.

Next, the operations of the candidate evaluation unit 131 and the statistics calculation unit 141 in the image analysis device of this example embodiment will be explained with reference to the flowchart of FIG. 7. The operations of the complex matrix calculation unit 110 and the candidate evaluation unit 130 are the same as those in the first example embodiment.

The conversion unit 132 converts a value of a candidate of parameter (for example, a value of a candidate of the displacement velocity v or a value of a candidate of the elevation h) to a phase by multiplying the value by the explanatory variable B (step S301). As an example, the conversion unit 132 calculates Bv or Bh. The conversion unit 132 may also perform the calculation of Bv+Bh. As mentioned above, as an example, the explanatory variable B is $B_m$, $B_n$ (for example, shooting times) when the parameter is a displacement velocity. As another example, the explanatory variable B is $B_m$, $B_n$ (for example, baseline distances) when the parameter is an elevation. The conversion unit 132 outputs a value (hereinafter, referred to as a phase) corresponding to the phase to the evaluation unit 134.

The random phase generator 133 generates one or more pairs of random phases for each of all SAR images (step S302). For example, when the number of SAR images is N, one pair of phases includes N phases. The random phase generator 133 outputs the generated pairs of random phases to the evaluation unit 135.

It is preferable that the random phase generator 133 generates random phases within a predetermined range for selecting candidates of parameter.

The evaluation unit 134 evaluates the phases output by the conversion unit 132, and the evaluation unit 135 evaluates the pairs of random phases output by the random phase generator 133 (step S303).

The integration unit 136 integrates the evaluation values of the pairs of random phases into an integrated evaluation value (step S304). One method of integration is to use the average value of respective evaluation values as the integrated evaluation value. The integration unit 136 may also use the mode value of respective evaluation values, the center value of respective evaluation values, the maximum value of respective evaluation values, the quantile of the evaluation values, etc. as the integrated evaluation value.

The comparison unit 137 compares the evaluation value of each phase (each phase corresponding to a candidate of parameter) output by the conversion unit 132 with the integrated evaluation value. Then, the comparison unit 137 outputs the evaluation value of the phase corresponding to the candidate of parameter for the evaluation value of the phase corresponding to the candidate of parameter that exceeds the integrated evaluation value. For the evaluation value of the phase corresponding to the candidate of parameter that is less than or equal to the integrated evaluation value, the comparison unit 137 replaces the evaluation value with the integrated evaluation value (step S305).

Figure 8B:
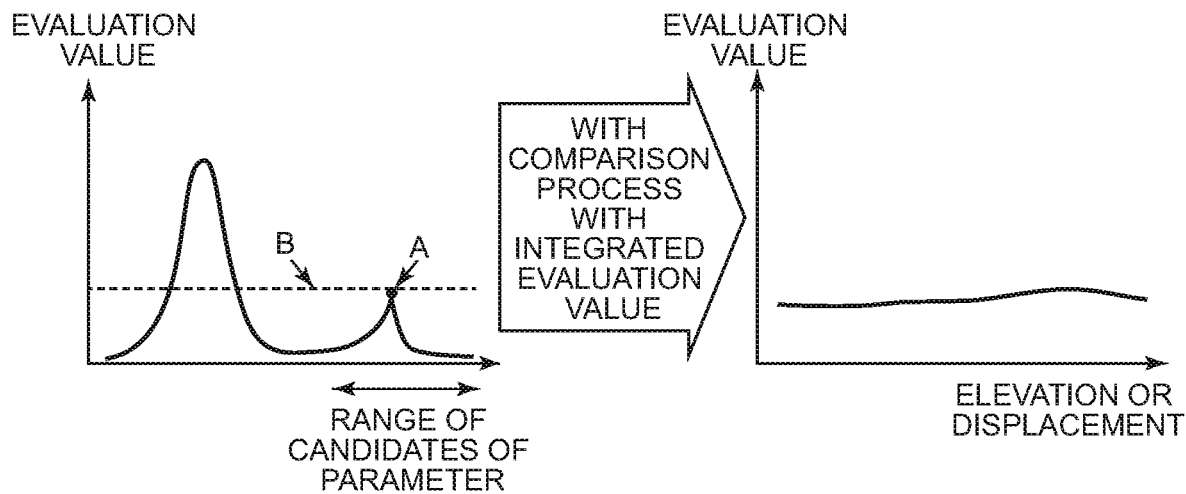
FIG. 8B It depicts an explanatory diagram for explaining the effect of the third example embodiment.

FIGS. 8A and 8B are explanatory diagrams for explaining the effect of this example embodiment. In FIGS. 8A and 8B, the "range of candidates of parameter" is a predetermined range of candidates of parameter to be selected.

As shown in FIG. 8A, if the process of step S305 is not present, there is a risk that the value of the parameter corresponding to peak A of the evaluation value, which is actually not the optimal value, may be judged to be plausible.

However, in this example embodiment, as shown in FIG. 8B, since there is a level B (for example, corresponding to the integrated evaluation value) to determine whether the evaluation value of the phase corresponding to the parameter candidate is output as is or the integrated evaluation value is output, the possibility that an inappropriate parameter value will be judged as plausible.

Example Embodiment 4

Figure 9:
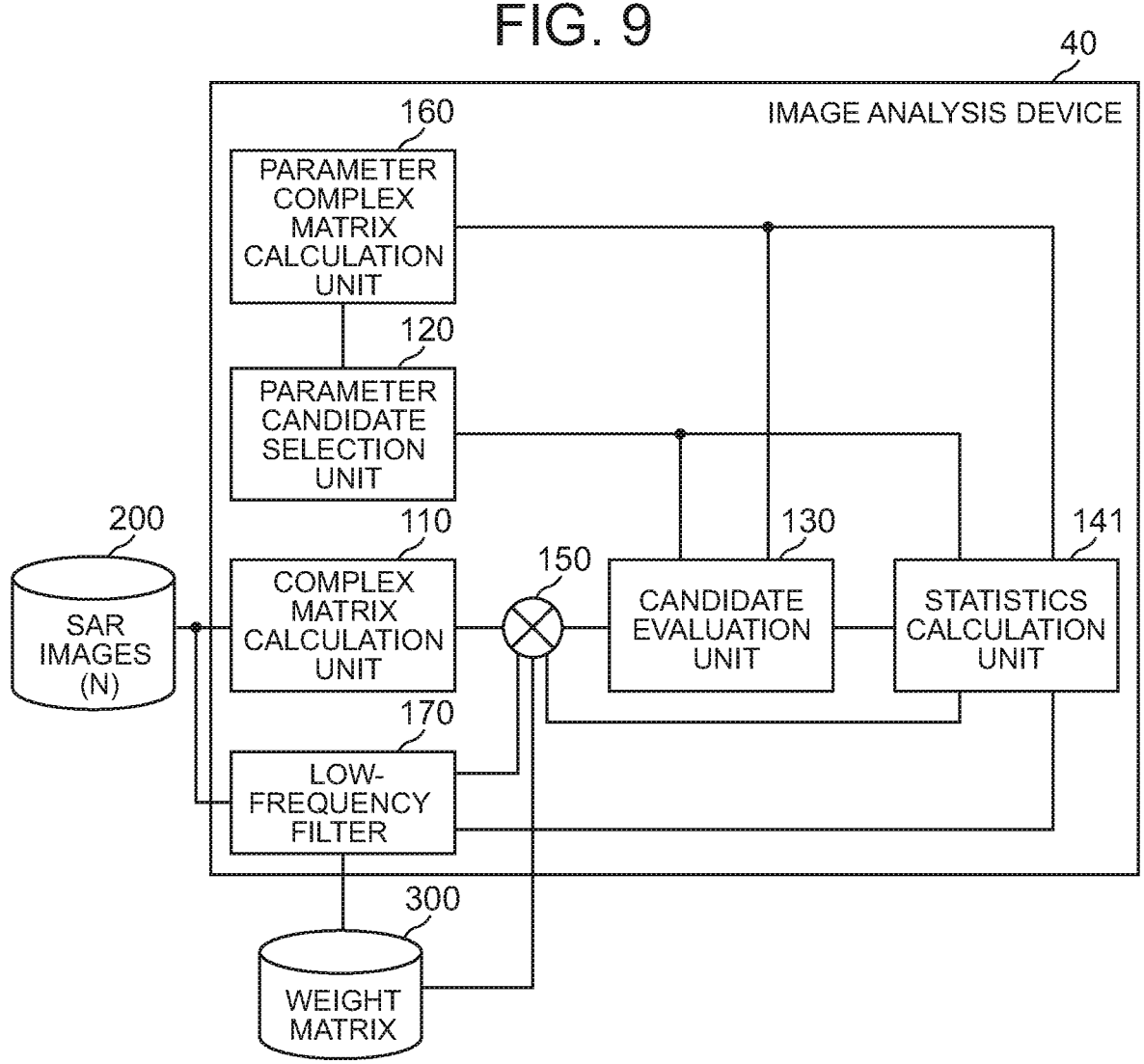
FIG. 9 It depicts a block diagram showing a configuration example of the image analysis device of the fourth example embodiment.

FIG. 9 is a block diagram showing an example configuration of the candidate evaluation unit in the image analysis device of the fourth example embodiment. The image analysis device 40 shown in FIG. 9 includes a low-frequency filter 170 in addition to the components of the image analysis device 20 of the second example embodiment.

When spatially low-frequency phase components caused by moisture in the atmosphere are included in the SAR image, the displacement estimation results may be inaccurate. Therefore, in this example embodiment, the low-frequency filter 170 is used to remove spatially low-frequency phase components. In this example embodiment, the fact that the low-frequency phase components form a smoothly distributed phase difference is used.

Figure 10:
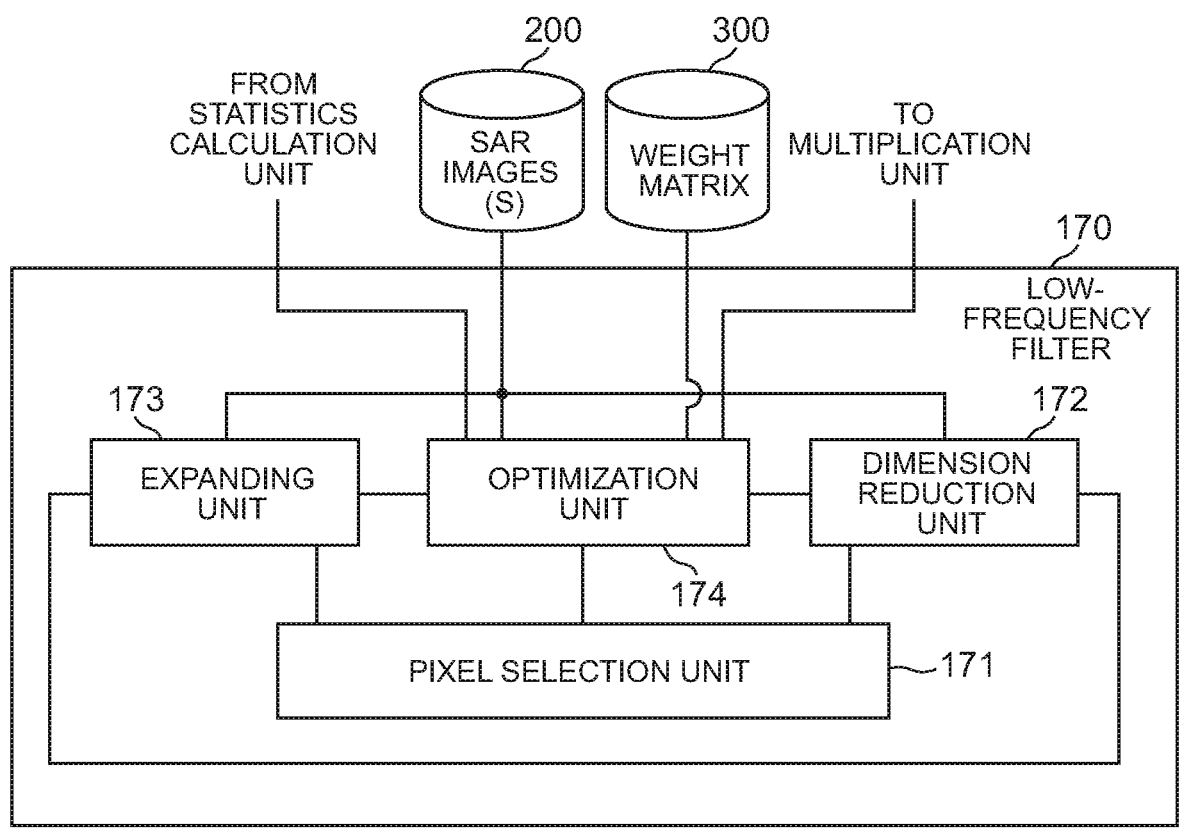
FIG. 10 It depicts a block diagram showing a configuration example of the low-frequency filter.

FIG. 10 is a block diagram showing a configuration example of the low-frequency filter 170. The low-frequency filter 170 includes a pixel selection unit 171, a dimension reduction unit 172, an expanding unit 173, and an optimization unit 174.

The pixel selection unit 171 selects multiple pixels in one SAR image from multiple SAR images in which the same area is recorded and aligned such that the same pixel position represents the same point. Then, the pixel selection unit 171 identifies pixels in other SAR images that are in the same position as the pixel in the above one SAR image. The pixel selection unit 171 specifies the position of the identified pixel. The dimension reduction unit 172 maps the pixels at the position specified by the pixel selection unit 171 to a low-dimensional space. The expanding unit 173 maps the pixels at the position specified by the pixel selection unit 171 from the low-dimensional space to the original pixel space.

The optimization unit 174 uses the coherence matrix for a pair of the above one SAR image and the other SAR image as a weight. The pixel selection unit 171 specifies one SAR image and the other SAR image. Then, the optimization unit 174 derives a pixel (represented by a complex vector; and corresponding to $x_{samp,s}$ described below) having a phase that is closer to both a calculation result output from the expanding unit 173 and a pixel value (observed pixel value) of the observed pixel at the position specified by the pixel selection unit 171.

The optimization unit 174 brings the complex vector having phase closer to the calculation result output from the expanding unit 173 by optimizing (for example, maximizing) a evaluation function (hereinafter, referred to as the spatial correlation evaluation function) that can evaluate spatially smoothly distributed phase differences. The optimization unit 174 brings the complex vector closer to the pixel value of the observed pixel at the position specified by the pixel selection unit 171 by optimizing (for example, maximizing) an observed signal evaluation function. When the observation signal evaluation function is optimized, the complex vector approaches the pixel value of the observed pixel in the area where the noise is relatively small.

In order to reduce the amount of operations, the low-frequency filter 170 does not perform an evaluation process for all pixels, but for randomly selected pixels from among all pixels. The low-frequency filter 170 performs an optimizing process after performing reduced-dimensional decomposition (low-rank approximation) of the spatial correlation matrix K, which is described below, in the spatial correlation evaluation function.

In detail, the image analysis device substantially reduced-dimensional decomposes the inverse matrix $K^{-1}$ of the spatial correlation matrix K. The image analysis device can, for example, perform reduced-dimensional decomposition using a method called Nystrom approximation. In that case, the image analysis device reduced-dimensional decomposes the inverse matrix $K^{-1}$ of the spatial correlation matrix K using equation (5).

[Math. 3]

$$K^{-1} \simeq \Lambda - VGV^T \tag{5}$$

In equation (5), G is a d×d matrix (d<N). V is an N×d matrix ($V=v_1, v_2, \ldots, v_d$). $\Lambda$ is an N×N diagonal matrix.

Figure 11:
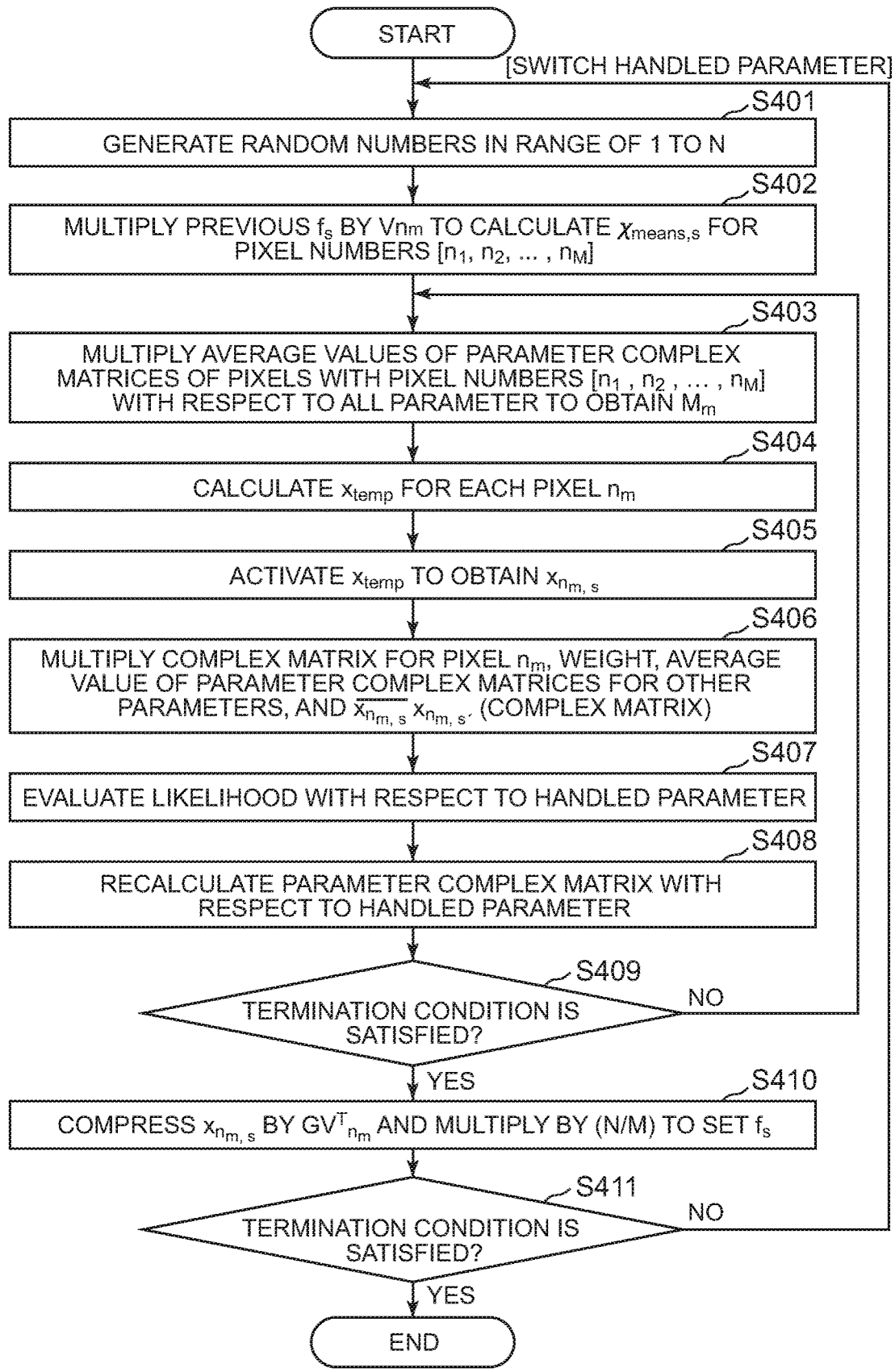
FIG. 11 It depicts a flowchart showing an operation of the image analysis device of the fourth example embodiment.

Next, the operation of the image analysis device 40 in this example embodiment is explained with reference to the flowchart in FIG. 11. The inverse matrix $K^{-1}$ of the spatial correlation matrix K expressed in equation (5) is set in advance in the image analysis device 10. The dimension reduction unit 172 uses a matrix $GV^T$ which is a part of the inverse matrix $K^{-1}$ of the spatial correlation matrix K. Thus, the matrices $GV^T$ and V may be set to the image analysis device 40.

As in the second example embodiment, in this example embodiment, processing for one type of parameter alternates with processing for another type of parameter. Hereinafter, suppose that the parameter of one type is a displacement velocity v, and the parameter of another type is an elevation h. First, the case where processing related to the elevation h is performed is taken as an example. That is, the image analysis device 40 first executes the process for elevation h.

The pixel selection unit 171 generates M (M<N) random numbers (step S401). N is the total number of pixels in the SAR image. M is a value greater than or equal to 2.

In this example embodiment, the pixel selection unit 171 selects pixels randomly, but it does not have to select randomly. For example, the pixel selection unit 110 may select M pixels from N pixels in a predetermined area according to a predetermined rule.

Hereinafter, $n_m$ is the pixel number of the pixel to be selected (m: 1 to M). It should be noted that $n_m$ will be one of 1 to M. S is the total number of SAR images. Let s be the image number (s: 1 to S). The pixel selection unit 171 uses each of generated multiple random numbers as the pixel number of the pixel to be selected. In other words, the pixel selection unit 171 selects pixels randomly.

The expanding unit 173 calculates $V_{means,s}$ by multiplying the previous $f_s$ by $Vn_m$ (step S402). The previous $f_s$ means the result of the operation of step S410 performed immediately before. Each of $Vn_m$ is a row vector generated by taking $n_1$ rows, $n_2$ rows, ..., $n_M$ rows from the matrix V. That is, for each pixel in the row corresponding to pixel numbers $n_1, n_2, \ldots, n_m$, the expanding unit 173 calculates $\chi_{means,s}$ using the corresponding row vector in matrix V. Hereinafter, $\chi_{means,s}$ is sometimes referred to as atmospheric phase estimate.

The optimization unit 174 multiplies average values of the parameter complex matrices of pixels with pixel numbers $n_1, n_2, \ldots, n_M$ with respect to all parameters (in this example, the elevation h and the displacement velocity v) to obtain $M_m$ (m: 1 to M) (step S403).

The optimization unit 174 uses equation (6) to obtain a temporary value of $x_{temp}$ (step S404). In equation (6), s and s' correspond to the image numbers of the images selected from S SAR images.

[Math. 4]

$$x_{temp} = \chi_{means,n_m,s} + \Sigma_{s' \neq s} w_{n_m,s,s'} M_m y_{n_m,s} \overline{y_{n_m,s'}} x_{n_m,s'} \tag{6}$$

The optimization unit 174 activates $x_{temp}$ to obtain $xn_m$s (step S405). In the equation (6), "n" in $xn_m$s is represented by a subscript. $xn_m$s is the same as the variable whose "n" is represented by a subscript in the equation (6).

In the process of step S405, the optimization unit 174 performs a nonlinear transformation of $x_{temp}$ using the nonlinear function g(a), as in equation (7) below.

[Math. 5]

$$x_{n_m,s} = \frac{g(|x_{temp}|)x_{temp}}{|x_{temp}|} \tag{7}$$

The following function can be used as the nonlinear function g(a).

$$g(a) = I_1(2a)/I_0(2a) \tag{8}$$

[Math. 6]

$$g(a) = \begin{cases} a < 1 & a \\ 1 \leq a & 1 \end{cases} \tag{9}$$

$$g(a) = \tanh(a) \tag{10}$$

$I_0$ and $I_1$ in equation (8) are first kind modified Bessel functions of order 0 and 1, respectively. When using equation (8), the value of g(a) approaches 1 as the value of a increases. Even when using equation (9) or equation (10), the value of g(a) approaches 1 as the value of a increases. Namely, in this example embodiment, the maximum value (in absolute value) of $xn_m$s is limited to 1.

Not limited to the functions illustrated in equations (8) to (10), the optimization unit 174 can use other functions such that the output value asymptotically approaches from 0 to a specific positive value as a increases.

The $xn_m$ obtained in the process of step S405 corresponds to the estimate that includes the uncertainty of the atmospheric phase.

In this example embodiment, the multiplication unit 150 multiplies the complex matrix at pixel $n_m$ output from the complex matrix calculation unit 110, the weight W stored in the weight matrix storage 300, the average value of the parameter complex matrices for the other parameters (when the elevation h is the parameter being handled, the displacement velocity v), and the complex matrix with the values expressed in the equation (11) as elements in the s rows and s' columns (step S406). The multiplication process of the complex matrix having the value represented by the equation (11) as elements of s rows and s' columns by the multiplication unit 150 makes it possible to suppress the phase component that depends on moisture in the atmosphere.

[Math. 7]

$$\overline{x_{n_m,s}} x_{n_m,s'} \tag{11}$$

The optimization unit 174 evaluates the likelihood of the values of all candidates of parameter being handled (for example, elevation h) in the same way as in the first and second example embodiments (step S407). As mentioned above, since the parameter complex matrix corresponds to a matrix for canceling a phase difference explained by a candidate of parameter (in this case, the candidate of displacement velocity v) that explains the phase difference, the candidate evaluation unit 130 can perform the evaluation for the elevation h with the influence of the displacement velocity v eliminated.

When the termination condition is satisfied, the process moves to step S410. When the termination condition is not satisfied, the process returns to step S403. The process from steps S403 to S408 is referred to as the first loop process. Thus, in step S409, it is judged whether or not the termination condition of the first loop processing is satisfied. As an example, the termination condition of the first loop processing is that the first loop processing has been executed a predetermined number of times.

In step S410, the dimension reduction unit 172 compresses $xn_m$s optimized by the optimization unit 174 using $GV^T n_m$ (step S410). Namely, the dimension reduction unit 172 multiplies $x_{samp,s}$ by $GV^T n_m$. The dimension reduction unit 172 further multiplies the multiplication result by (N/M). The value by which the multiplication result is multiplied by (N/M) is expressed as L. Since the first loop process is executed for M pixels selected from all N pixels, the multiplication result between $x_{samp,s}$ and $GV^T n_m$ is (M/N) times the original value. The dimension reduction unit 172 multiplies the multiplication result by (N/M) to restore the original value.

When the termination condition is satisfied, the process is terminated. When the termination condition is not satisfied, the process returns to step S401. The process of steps S401 to S4104 is referred to as the second loop processing. When the next second loop process is executed by returning to step S401, the processing object (parameter to be handled) is switched. When the parameter being handled was the elevation h, the processing object is switched from the elevation h to the displacement velocity v. When the parameter being handled was the displacement velocity v, the processing object is switched from the displacement velocity v to the elevation h.

The termination condition is, for example, that the likelihood of all parameters (in this example, the displacement velocity v and the elevation h) is less than a predetermined value relative to the values obtained in the previous processing in step S407. Thus, the termination condition is that variation amount of the likelihood of the parameter has become smaller. In other words, the termination condition is that the likelihood of the parameter is judged to have converged to the optimal value. For example, the condition that the second loop process is executed a predetermined number of times may be used as the termination condition.

In this example embodiment, the low-frequency filter 170 performs operations that include atmospheric phase uncertainty, it becomes to be possible to suppress the phase component that depends on moisture in the atmosphere.

Figure 12:
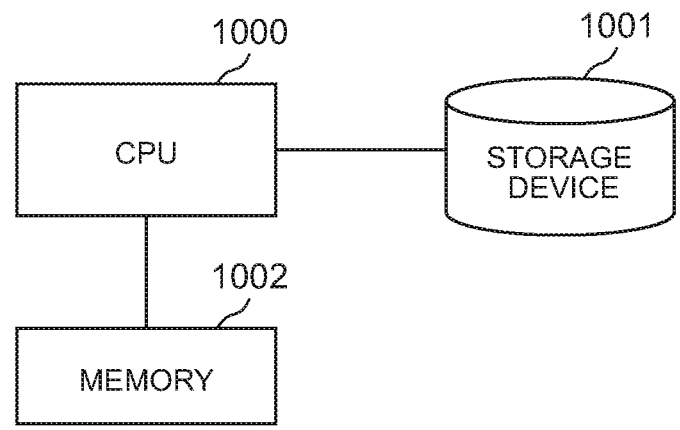
FIG. 12 It depicts a block diagram showing an example of a computer with a CPU.

FIG. 12 is a block diagram showing an example of a computer with a CPU (central processing unit). The computer is implemented in image analysis devices of each of the above example embodiments. The CPU 1000 executes processing in accordance with a program (software component: codes) stored in a storage device 1001 to realize the functions in the above example embodiments. That is to say, the functions of the complex matrix calculation unit 110, the parameter candidate selection unit 120, the candidate evaluation units 130, 131, the statistics calculation units 140, 141, the multiplication unit 150, the parameter complex matrix calculation unit 160, the low-frequency filter 170, the conversion unit 132, the random phase generator 133, the evaluation unit 134, the evaluation unit 135, the integration unit 136, the comparison unit 137, the pixel selection unit 171, the dimension reduction unit 172, the expanding unit 173, and the optimization unit 174 in the image analysis devices 10, 20, 40 shown in FIG. 1, FIG. 4, FIG. 6, FIG. 9, FIG. 10. Instead of CPU 1000, a GPU (Graphics Processing Unit)) or a combination of a CPU and a GPU can be used.

The storage device 1001 is, for example, a non-transitory computer readable media. The non-transitory computer readable medium is one of various types of tangible storage media. Specific examples of the non-transitory computer readable media include a magnetic storage medium (for example, hard disk), a magneto-optical storage medium (for example, magneto-optical disk), a compact disc-read only memory (CD-ROM), a compact disc-recordable (CD-R), a compact disc-rewritable (CD-R/W), and a semiconductor memory (for example, a mask ROM, a PROM (programmable ROM), an EPROM (erasable PROM), a flash ROM).

When a rewritable data storage medium is used as the storage device 1001, the storage device 1001 can also be used as the SAR image storage 200 and the weight matrix storage 300.

The program may be stored in various types of transitory computer readable media. The transitory computer readable medium is supplied with the program through, for example, a wired or wireless communication channel, i.e., through electric signals, optical signals, or electromagnetic waves.

A memory 1002 is a storage means implemented by a RAM (Random Access Memory), for example, and temporarily stores data when the CPU 1000 executes processing. It can be assumed that a program held in the storage device 1001 or a temporary computer readable medium is transferred to the memory 1002 and the CPU 1000 executes processing based on the program in the memory 1002.

Figure 13:
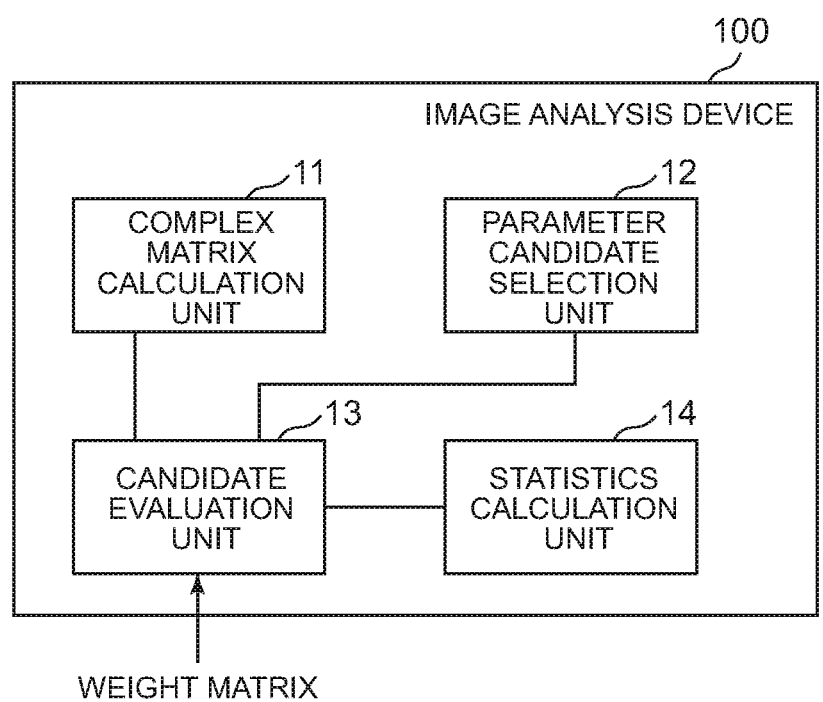
FIG. 13 It depicts a block diagram showing the main part of the image analysis device.
Figure 14:
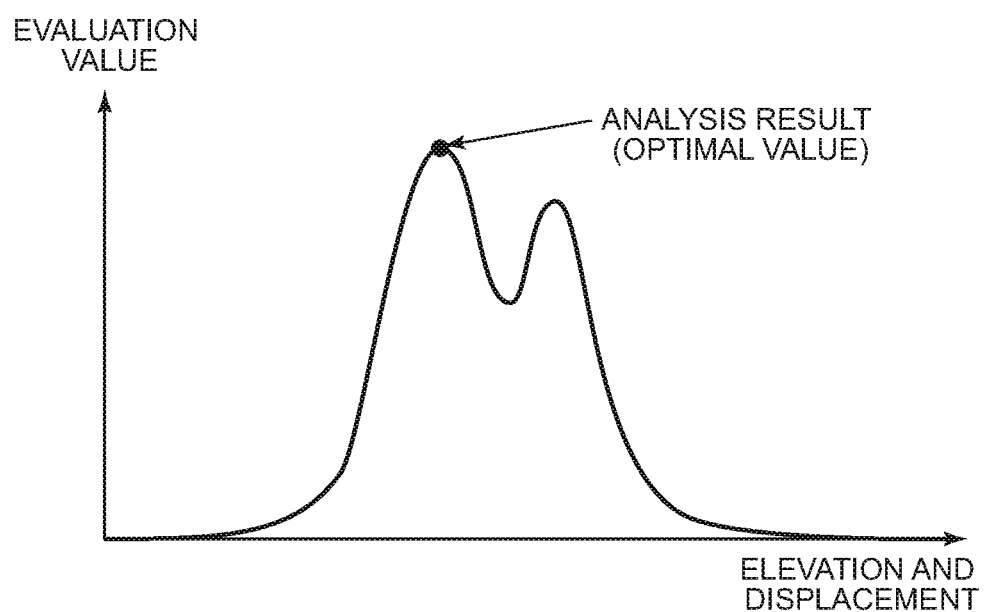
FIG. 14 It depicts an explanatory diagram showing an example of the elevation and displacement analysis results.

FIG. 13 is a block diagram showing the main part of the image analysis device. The image analysis device 100 shown in FIG. 13 comprises a complex matrix calculation unit (complex matrix calculation means) 11 (in the example embodiments, realized by the complex matrix calculating unit 110) which calculates a complex matrix that reflects a phase difference in all pairs of images in multiple images in which a same region is recorded, a parameter candidate selection unit (parameter candidate selection means) 12 (in the example embodiments, realized by the parameter candidate selection unit 120) which selects multiple candidates of parameter which explains a phase shift, a candidate evaluation unit (candidate evaluation means) 13 (in the example embodiments, realized by the candidate evaluation unit 130) which evaluates likelihood of the multiple candidates using the complex matrix and a predetermined weight matrix, and a statistics calculation unit (statistics calculation means) 14 (in the example embodiments, realized by the statistics calculation unit 140) which weights the candidates of parameter by the likelihood and calculates statistics of the candidates of parameter.

A part of or all of the above example embodiments may also be described as, but not limited to, the following supplementary notes.

(Supplementary note 1) A$_n$ image analysis device comprising:
complex matrix calculation means for calculating a complex matrix that reflects a phase difference in all pairs of images in multiple images in which a same region is recorded;
parameter candidate selection means for selecting multiple candidates of parameter which explains a phase shift;
candidate evaluation means for evaluating likelihood of the multiple candidates using the complex matrix and a predetermined weight matrix; and
statistics calculation means for weighting the candidates of parameter by the likelihood and calculating statistics of the candidates of parameter.

(Supplementary note 2) The image analysis device according to Supplementary note 1, further comprising
multiplication means (in the example embodiments, realized by the multiplication unit 150) for multiplying the complex matrix by the weight matrix, and outputting a multiplication result to the candidate evaluation means.

(Supplementary note 3) The image analysis device according to Supplementary note 1, further comprising
parameter complex matrix calculation means (in the example embodiments, realized by the parameter complex matrix calculation unit 160) for outputting a parameter complex matrix having a phase value in each image for each of the candidates of parameter,
wherein
the statistics calculation means calculates an average of the parameter complex matrix, and
the candidate evaluation means evaluates the likelihood of the multiple candidates also using the average of the parameter complex matrix.

(Supplementary note 4) The image analysis device according to Supplementary note 3, comprising
multiplication means (in the example embodiments, realized by the multiplication unit 150) for multiplying the complex matrix, the weight matrix and the average of the parameter complex matrix, and outputting a multiplication result to the candidate evaluation means.

(Supplementary note 5) The image analysis device according to claim 3 or 4, wherein
the parameter candidate selection means selects the candidate for each of multiple parameters,
the candidate evaluation means alternates an evaluation of the candidate of one parameter and an evaluation of the candidate of another parameter, and uses, as the parameter complex matrix, a parameter complex matrix for different parameter from the parameter to be evaluated.

(Supplementary note 6) The image analysis device according to any one of claims 1 to 5, wherein
the candidate evaluation means includes
conversion means (in the example embodiments, realized by the conversion unit 132) for converting the candidate of parameter to a phase,
first evaluation means (in the example embodiments, realized by the evaluation unit 134) for evaluating the phase obtained by the conversion means to calculate a first evaluation value,
random phase generation means (in the example embodiments, realized by the random phase generation unit 133) for generating one or more pairs of random phases for each of the images,
second evaluation means (in the example embodiments, realized by the evaluation unit 135) for evaluating the pair of random phases to calculate one or more second evaluation values,
integration means (in the example embodiments, realized by the integration unit 136) for integrating the one or more second evaluation values, and
comparison means (in the example embodiments, realized by the comparison unit 137) for replacing the first evaluation value by integrated second evaluation value by the integration means, when the first evaluation value is less than or equal to the integrated second evaluation value.

(Supplementary note 7) The image analysis device according to any one of claims 1 to 6, wherein
the statistics of the candidates of parameter includes an average value and a variance of the candidates of parameter.

(Supplementary note 8) A$_n$ image analysis method comprising:
calculating a complex matrix that reflects a phase difference in all pairs of images in multiple images in which a same region is recorded;
selecting multiple candidates of parameter which explains a phase shift;
evaluating likelihood of the multiple candidates using the complex matrix and a predetermined weight matrix; and
weighting the candidates of parameter by the likelihood and calculating statistics of the candidates of parameter.

(Supplementary note 9) The image analysis method according to Supplementary note 8, further comprising
outputting a parameter complex matrix having a phase value in each image for each of the candidates of parameter,
calculating an average of the parameter complex matrix when calculating the statistics, and
evaluating the likelihood of the multiple candidates also using the average of the parameter complex matrix.

(Supplementary note 10) The image analysis method according to Supplementary note 9, further comprising
selecting the candidate for each of multiple parameters, and
alternating an evaluation of the candidate of one parameter and an evaluation of the candidate of another parameter,
wherein as the parameter complex matrix, a parameter complex matrix for different parameter from the parameter to be evaluated is used.

(Supplementary note 11) The image analysis method according to any one of Supplementary notes 8 to 10,
when evaluating likelihood of the multiple candidates,
converting the candidate of parameter to a phase,
evaluating the phase to calculate a first evaluation value,
generating one or more pairs of random phases for each of the images,
evaluating the pair of random phases to calculate one or more second evaluation values,
integrating the one or more second evaluation values, and
replacing the first evaluation value by integrated second evaluation value, when the first evaluation value is less than or equal to the integrated second evaluation value.

(Supplementary note 12) A computer readable recording medium storing an image analysis program, wherein
the image analysis program causes a computer to execute:
a process of calculating a complex matrix that reflects a phase difference in all pairs of images in multiple images in which a same region is recorded;
a process of selecting multiple candidates of parameter which explains a phase shift;
a process of evaluating likelihood of the multiple candidates using the complex matrix and a predetermined weight matrix; and
a process of weighting the candidates of parameter by the likelihood and calculating statistics of the candidates of parameter.

(Supplementary note 13) The recording medium according to Supplementary note 12,
wherein the image analysis program causes the computer to further execute
a process of outputting a parameter complex matrix having a phase value in each image for each of the candidates of parameter,
a process of calculating an average of the parameter complex matrix when calculating the statistics, and
a process of evaluating the likelihood of the multiple candidates also using the average of the parameter complex matrix.

(Supplementary note 14) The recording medium according to Supplementary note 13,
wherein the image analysis program causes the computer to further execute
a process of selecting the candidate for each of multiple parameters, and a process of alternating an evaluation of the candidate of one parameter and an evaluation of the candidate of another parameter, wherein as the parameter complex matrix, a parameter complex matrix for different parameter from the parameter to be evaluated is used.

(Supplementary note 15) An image analysis program causing a computer to execute:

a process of outputting a parameter complex matrix having a phase value in each image for each of the candidates of parameter, a process of calculating an average of the parameter complex matrix when calculating the statistics, and a process of evaluating the likelihood of the multiple candidates also using the average of the parameter complex matrix.

(Supplementary note 16) The image analysis program according to Supplementary note 15, wherein the image analysis program causes the computer to further execute a process of outputting a parameter complex matrix having a phase value in each image for each of the candidates of parameter, a process of calculating an average of the parameter complex matrix when calculating the statistics, and a process of evaluating the likelihood of the multiple candidates also using the average of the parameter complex matrix.

(Supplementary note 17) The image analysis program according to Supplementary note 16, wherein the image analysis program causes the computer to further execute a process of selecting the candidate for each of multiple parameters, and a process of alternating an evaluation of the candidate of one parameter and an evaluation of the candidate of another parameter, wherein as the parameter complex matrix, a parameter complex matrix for different parameter from the parameter to be evaluated is used.

Although the invention of the present application has been described above with reference to example embodiments, the present invention is not limited to the above example embodiments. Various changes can be made to the configuration and details of the present invention that can be understood by those skilled in the art within the scope of the present invention.

REFERENCE SIGNS LIST

11 Complex matrix calculation unit
12 Parameter candidate selection unit
13 Candidate evaluation unit
14 Statistics calculation unit
10, 20, 40 Image analysis device
100 Image analysis device
110 Complex matrix calculation unit
120 Parameter candidate selection unit
130, 131 Candidate evaluation unit
132 Conversion unit
133 Random phase generator
134, 135 Evaluation unit
136 Integration unit
137 Comparison unit
140, 141 Statistics calculation unit
150 Multiplication unit
160 Parameter complex matrix calculation unit
170 Low-frequency filter
171 Pixel selection unit
172 Dimension reduction unit
173 Expanding unit
174 Optimization unit
200 SAR image storage
300 Weight matrix storage
1000 CPU
1001 Storage device
1002 Memory

What is claimed is:

1. An image analysis device comprising:
a memory storing software instructions, and
one or more processors configured to execute the software instructions to:
obtain multiple images using synthetic aperture radar technology;
calculate a complex matrix that reflects a phase difference in all pairs of images in the multiple images in which a same region is recorded;
select multiple candidates of a parameter which corresponds to a phase shift;
evaluate a likelihood of the multiple candidates using the complex matrix and a predetermined weight matrix;
and
weight the multiple candidates of the parameter by the likelihood and calculate statistics of the multiple candidates of the parameter;
convert the multiple candidates of the parameter to a phase;
evaluate the phase obtained by the conversion to calculate a first evaluation value;
generate one or more pairs of random phases for each of the multiple images;
evaluate the one or more pairs of random phases to calculate one or more second evaluation values;
integrate the one or more second evaluation values;
replace the first evaluation value by the integrated one or more second evaluation values by the integration, based on the first evaluation value being less than or equal to the integrated one or more second evaluation values; and
output the first evaluation value.

2. The image analysis device according to claim 1, wherein
the one or more processors are further configured to execute the software instructions to multiply the complex matrix by the predetermined weight matrix, and output a multiplication result.

3. The image analysis device according to claim 1, wherein
the one or more processors are further configured to execute the software instructions to output a parameter complex matrix having a phase value in each image for each of the multiple candidates of the parameter,
calculate an average of the parameter complex matrix, and
evaluate the likelihood of the multiple candidates using the average of the parameter complex matrix.

4. The image analysis device according to claim 3, wherein
the one or more processors are further configured to execute the software instructions to multiply the complex matrix, the predetermined weight matrix and the average of the parameter complex matrix, and outputting a multiplication result.

5. The image analysis device according to claim 3, wherein
the one or more processors are further configured to execute the software instructions to:
select a candidate for each of multiple parameters, and
alternate an evaluation of a candidate of one parameter and an evaluation of a candidate of another parameter, and use, as the parameter complex matrix, a parameter complex matrix for a different parameter from a parameter to be evaluated.

6. The image analysis device according to claim 1, wherein
the statistics of the multiple candidates of the parameter includes an average value and a variance of the multiple candidates of the parameter.

7. An image analysis method, implemented by a processor, comprising:
obtaining multiple images using synthetic aperture radar technology;
calculating a complex matrix that reflects a phase difference in all pairs of images in the multiple images in which a same region is recorded;
selecting multiple candidates of a parameter which corresponds to a phase shift;
evaluating a likelihood of the multiple candidates using the complex matrix and a predetermined weight matrix;
weighting the multiple candidates of the parameter by the likelihood and calculating statistics of the multiple candidates of the parameter;
converting the multiple candidates of the parameter to a phase;
evaluating the phase obtained by the conversion to calculate a first evaluation value;
generating one or more pairs of random phases for each of the multiple images;
evaluating the one or more pairs of random phases to calculate one or more second evaluation values;
integrating the one or more second evaluation values;
replacing the first evaluation value by the integrated one or more second evaluation values by the integration, based on the first evaluation value being less than or equal to the integrated one or more second evaluation values; and
outputting the first evaluation value.

8. The image analysis method according to claim 7, further comprising:
outputting a parameter complex matrix having a phase value in each image for each of the multiple candidates of the parameter,
calculating an average of the parameter complex matrix when calculating the statistics, and
evaluating the likelihood of the multiple candidates using the average of the parameter complex matrix.

9. The image analysis method according to claim 8, further comprising:
selecting a candidate for each of multiple parameters,
alternating an evaluation of a candidate of one parameter and an evaluation of a candidate of another parameter, and
using, as the parameter complex matrix, a parameter complex matrix for a different parameter from a parameter to be evaluated.

10. A non-transitory computer readable recording medium storing an image analysis program which, when executed by a processor, performs:
obtaining multiple images using synthetic aperture radar technology;
calculating a complex matrix that reflects a phase difference in all pairs of images in the multiple images in which a same region is recorded;
selecting multiple candidates of a parameter which corresponds to a phase shift;
evaluating a likelihood of the multiple candidates using the complex matrix and a predetermined weight matrix;
weighting the multiple candidates of the parameter by the likelihood and calculating statistics of the multiple candidates of the parameter;
converting the multiple candidates of the parameter to a phase;
evaluating the phase obtained by the conversion to calculate a first evaluation value;
generating one or more pairs of random phases for each of the multiple images;
evaluating the one or more pairs of random phases to calculate one or more second evaluation values;
integrating the one or more second evaluation values;
replacing the first evaluation value by the integrated one or more second evaluation values by the integration, based on the first evaluation value being less than or equal to the integrated one or more second evaluation values; and
outputting the first evaluation value.

11. The non-transitory computer readable recording medium according to claim 10, further comprising:
outputting a parameter complex matrix having a phase value in each image for each of the multiple candidates of the parameter,
calculating an average of the parameter complex matrix when calculating the statistics, and
evaluating the likelihood of the multiple candidates also using the average of the parameter complex matrix.

12. The non-transitory computer readable recording medium according to claim 11, further comprising:
selecting a candidate for each of multiple parameters,
alternating an evaluation of a candidate of one parameter and an evaluation of a candidate of another parameter, and
using, as the parameter complex matrix, a parameter complex matrix for different parameter from a parameter to be evaluated.

* * * * *